US010590985B1

(12) United States Patent
Lagred et al.

(10) Patent No.: US 10,590,985 B1
(45) Date of Patent: Mar. 17, 2020

(54) MOUNT SYSTEM WITH BEARING RACE FRICTION LOCK ASSEMBLY FOR AGRICULTURAL MACHINE

(71) Applicant: CNH Industrial America LLC, New Holland, PA (US)

(72) Inventors: Edward A. Lagred, Benson, MN (US); Martin L. Krohn, DeGraff, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/242,718

(22) Filed: Jan. 8, 2019

(51) Int. Cl.
| | |
|---|---|
| F16C 11/06 | (2006.01) |
| F16C 13/02 | (2006.01) |
| F16C 23/06 | (2006.01) |
| B21D 7/08 | (2006.01) |
| B62D 7/08 | (2006.01) |
| F16C 23/04 | (2006.01) |

(52) U.S. Cl.
CPC ............... *F16C 23/06* (2013.01); *B62D 7/08* (2013.01); *F16C 13/022* (2013.01); *F16C 23/045* (2013.01); *F16C 11/0614* (2013.01); *F16C 11/0685* (2013.01); *F16C 2326/05* (2013.01); *F16C 2326/24* (2013.01)

(58) Field of Classification Search
CPC . F16C 11/0614; F16C 11/028; F16C 11/0685; F16C 13/022; F16C 23/06; F16C 23/045; F16C 2326/05; F16C 2326/24; F16C 11/0628; B62D 7/08; B62D 7/14
USPC ................ 384/206, 208, 282, 271, 275–276; 402/78, 90, 102, 156; 403/78, 90, 102, 403/156, 221, 223, 344
See application file for complete search history.

(56) References Cited

U.S. PATENT DOCUMENTS

| | | | | |
|---|---|---|---|---|
| 1,456,577 | A * | 5/1923 | Rosenthal | .................. F16J 1/22 403/143 |
| 2,149,712 | A * | 3/1939 | Wallgren | ................ B21B 31/07 277/423 |
| 2,387,105 | A | 10/1945 | Yager | |
| 3,510,178 | A * | 5/1970 | Sowatzke | ........... F16C 11/0614 384/206 |

(Continued)

FOREIGN PATENT DOCUMENTS

| | | |
|---|---|---|
| CN | 203279475 U | 11/2013 |
| CN | 103879439 A | 6/2014 |

(Continued)

OTHER PUBLICATIONS

PEER Bearing Company; Agricultural Bearings; website product information; 4 pages; Nov. 13, 2018.

*Primary Examiner* — Marcus Charles
(74) *Attorney, Agent, or Firm* — Rebecca L. Henkel; Rickard K. DeMille

(57) ABSTRACT

A steering cylinder mount system with a bearing race frictional lock assembly for an agricultural machine is provided that frictionally secures a bearing's inner race with respect to another component in a manner that ensures the bearing's inner and outer races rotate with respect to each other in preference to rotating the inner race with respect to an internally arranged supporting component. The bearing race friction lock assembly may frictionally engage multiple surfaces of the spherical bearing's inner race to lock the inner race with respect to its inwardly arranged supporting component(s).

20 Claims, 5 Drawing Sheets

(56) References Cited

U.S. PATENT DOCUMENTS

| | | | | |
|---|---|---|---|---|
| 3,535,945 A | * | 10/1970 | Bowman | B66C 23/86 |
| | | | | 74/129 |
| 4,359,123 A | * | 11/1982 | Haupt | B62D 5/10 |
| | | | | 180/436 |
| 4,475,615 A | * | 10/1984 | Stanek | B62D 5/12 |
| | | | | 180/417 |
| 4,541,742 A | | 9/1985 | Lederman | |
| 5,074,698 A | * | 12/1991 | Lippert | B62D 7/16 |
| | | | | 403/131 |
| 5,492,415 A | | 2/1996 | Jordens et al. | |
| 7,093,996 B2 | * | 8/2006 | Wallace | B64D 27/26 |
| | | | | 403/78 |
| 7,311,446 B2 | | 12/2007 | Koschinat | |
| 8,376,078 B2 | | 2/2013 | Hiddema | |
| D679,302 S | * | 4/2013 | Wilkinson | D15/143 |
| 9,278,594 B2 | | 3/2016 | Horsch | |
| 9,616,848 B2 | | 4/2017 | Caverly | |
| 2012/0230813 A1 | * | 9/2012 | Tsukidate | F04D 29/563 |
| | | | | 415/150 |
| 2017/0146058 A1 | | 5/2017 | Heldmann et al. | |
| 2017/0313414 A1 | * | 11/2017 | Baird | B64C 25/18 |

FOREIGN PATENT DOCUMENTS

| | | | | |
|---|---|---|---|---|
| DE | 2446771 B1 | * | 9/1975 | B29B 7/68 |
| DE | 102012005860 A1 | | 9/2013 | |
| EP | 2829749 A2 | * | 1/2015 | F16C 33/74 |
| EP | 3127782 A1 | | 8/2017 | |
| GB | 191501221 A | * | 3/1916 | H05B 31/18 |
| GB | 482685 A | * | 4/1938 | F16F 15/32 |
| KR | 20110071890 A | * | 6/2011 | |
| WO | 2006092256 A1 | | 8/2006 | |

* cited by examiner

MOUNT SYSTEM WITH BEARING RACE FRICTION LOCK ASSEMBLY FOR AGRICULTURAL MACHINE

FIELD OF THE INVENTION

The invention relates generally to steering component mounting hardware for agricultural machines and, in particular, to a steering cylinder mount system with a bearing race friction lock assembly.

BACKGROUND OF THE INVENTION

Over time, agricultural machines, including sprayers and other applicators, have gotten larger to increase machine efficiency. These larger machines are also heavier, which require larger steering forces that can put substantial stresses on steering components and the joints that connect steering components to each other. Examples include connections at the ends of hydraulic steering cylinders to mounting tabs of various components. One end of each steering cylinder is connected to a mounting tab or lug of a steering arm that turns a respective wheel to steer, and a second end of each steering cylinder is connected to a mounting lug on the frame or axle, such as an axle-width adjusting slide bar or other component for adjustable-width machines. Pushing and pulling the steering arms with the substantial steering forces in these large agricultural machines make the connections between the ends of the steering cylinders and the mounting lugs susceptible to loosening and wear, which can lead to sloppy steering feel and component failure. Attempts have been made to improve maintaining tightness at the joints between the steering cylinders and mounting lugs. These attempts include mounting a spherical bearing in each mounting lug and bolting the cylinder end yokes to the mounting lug, through the inner race of the spherical bearing. However, the bolts used in this way as the spherical bearing shafts are typically standard bolts, which often provide a loose fit between the bolts and the inner races. Efforts to ensure that a spherical bearing's inner race rotates with respect to its outer race instead of with respect to the loose-fitting bolt include mounting split spring bushings in each yoke lobe of the cylinders' end yokes. Tightening the bolt clamps the engaging end/edge surfaces of the split spring bushings and the end/edge surface of the spherical bearing's inner race, which helps hold the spherical bearing inner race fixed with respect to the cylinder yoke and therefore rotate with respect to its outer race. However, when the system is subjected to the large steering forces, the bolt can loosen over time. This unloads the longitudinal clamping force between the end/edge surfaces of the split spring bushings and the spherical bearing's inner race, which makes the spherical bearing's inner race susceptible to rotating in unison with its outer race and instead tends to rotate with respect to the bolt. If the bolt is not retightened to reapply the longitudinal clamping force between the end/edge surfaces of the split spring bushings and the spherical bearing's inner race, then the continued rotation of the inner race with respect to the bolt causes wear in the bolt, which further loosens the joint. Attempts have been made to maintain tightness of the bolt by using a slotted nut and split pin or cotter pin to prevent rotation of the slotted nut. However, slotted nuts can occasionally rotate slightly before the cotter pin sufficiently jams and prevents their further rotation. This can provide enough looseness to unload the longitudinal clamping force between the end/edge surfaces of the split spring bushings and the spherical bearing's inner race and allow rotation of the inner race on the bolt and correspondingly accelerate wear.

SUMMARY OF THE INVENTION

A steering cylinder mount system with a bearing race frictional lock assembly for an agricultural machine is provided that frictionally secures a bearing's inner race with respect to another component to ensure that the bearing's inner and outer races rotate with respect to each other in preference to rotating the inner race with respect to a mounting shaft through it. The system is implemented in joints or connection locations of a steering cylinder and its cooperating steering components, such as at the connection between the steering cylinder's moving end and a steering arm or between the steering cylinder's fixed end and an axle or frame to which it is anchored.

According to one aspect of the invention, the steering cylinder mount system includes a bearing race friction lock assembly that frictionally engages multiple surfaces of the spherical bearing's inner race to lock the inner race with respect to its inwardly arranged supporting components to ensure its rotation with respect to the outer race.

According to another aspect of the invention, the spherical bearing is mounted in a steering arm, such as at its mounting lug which extends from its pivot axis and is configured to connect to a steering cylinder. A sleeve, which may be implemented as a split spring bushing, is pressed into the spherical bearing's inner race so that the ends of the split spring bushing extend past the inner race in both directions. This inner split spring bushing expands in the inside diameter of the inner race and applies pressure outwardly against the inner race's inner circumferential surface, providing a frictional engagement that locks the inner split spring bushing and the inner race to each other and prevents their rotation with respect to each other, which ensures rotation of the inner race with respect to the spherical bearing's outer race.

According to another aspect of the invention, collars, which may be implemented as split spring bushings that are shorter than the inner split spring bushing, are mounted to the ends of the inner split spring bushing that extend beyond the spherical bearing inner race. These outer spring bushings engage the ends or annular end surfaces of the spherical bearing's inner race. The spherical bearing's inner race is therefore engaged at the different surfaces by the assemblage of the split spring bushings. Each of the split spring bushings is configured to provide a frictional engagement with the spherical bearing inner race in a different direction of force application. The inner split spring bushing presses outwardly against the inner circumferential surface of the inner race and the outer split spring bushings press against the ends or annular end surfaces of the inner race.

According to another aspect of the invention, a fastener system, which may include a bolt, extends through the inner split spring bushing, the outer split spring bushings, and the spherical bearing inner race. Tightening the bolt or other fastener applies a compressive force to the outer split ring bushings to provide face-to-face axial frictional engagements between their end surfaces and those of the spherical bearing inner race while the inner split spring bushing pushes outwardly against the inner circumferential surface of the spherical bearing inner race.

According to another aspect of the invention, the system provides a friction-locked rotatable stack that is defined by the bolt, the inner split spring bushings, the first and second outer split spring bushings, and the spherical bearing inner race. All these components are frictionally locked with respect to, and rotate or otherwise move in unison with, each other. The outer split spring bushings may be press-fit into lobes of a yoke at the end of the steering cylinder, whereby the steering cylinder yokes are also frictionally locked with respect to the friction-locked rotatable stack. As implemented in a steering application, these components typically are either held substantially fixed at the anchor end of the steering cylinder or moved primarily in a linear reciprocating motion at the movable or actuating end of the steering cylinder, whereby the rotation in the system is experienced as relative rotation between the inner and outer races of the spherical bearing. This relative rotation of the spherical bearing inner and outer races with respect to each other may occur mostly as the outer race and steering arm mounting lug pivoting with respect to the inner race, which converts the substantially linear movement of the steering cylinder into a pivoting movement of the steering arm for turning the wheel during a steering maneuver.

According to another aspect of the invention, a method of assembling a steering cylinder mount system for an agricultural machine is provided. The steering cylinder mount system may include a mounting lug with a spherical bearing and a steering cylinder with a yoke with first and second yoke lobes connected to the mounting lug. The method includes pressing a first collar, such as a first outer split spring bushing, into a first yoke lobe of the yoke and a second collar, such as a second outer split spring bushing, into a second yoke lobe of the yoke. The spherical bearing in the mounting lug is positioned between the yoke lobes so that bores of the outer split spring bushings and an inner race of the spherical bearing align with each other. A sleeve, such as an inner split spring bushing, is pressed through the bores of the outer split spring bushings and spherical bearing inner race so the so the inner split spring bushing concentrically and frictionally engages outer split spring bushings and spherical bearing inner race from inside, pushing outwardly. A fastener, such as a bolt, is inserted through the bore of the inner split spring bushings. The bolt is tightened, which locks the bolt, the inner and outer split spring bushings, and the spherical bearing inner race to each other to move as a frictionally unitized stack or friction-locked rotatable stack. This facilitates relative rotation of the spherical bearing's outer and inner races with respect to each other, in preference to relative rotation of components within the frictionally unitized stack. It is understood that the steering cylinder mount system could be configured so that the spherical bearings are be pressed into the steering cylinder ends and the yokes are part of the steering arm(s) and frame mount(s).

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
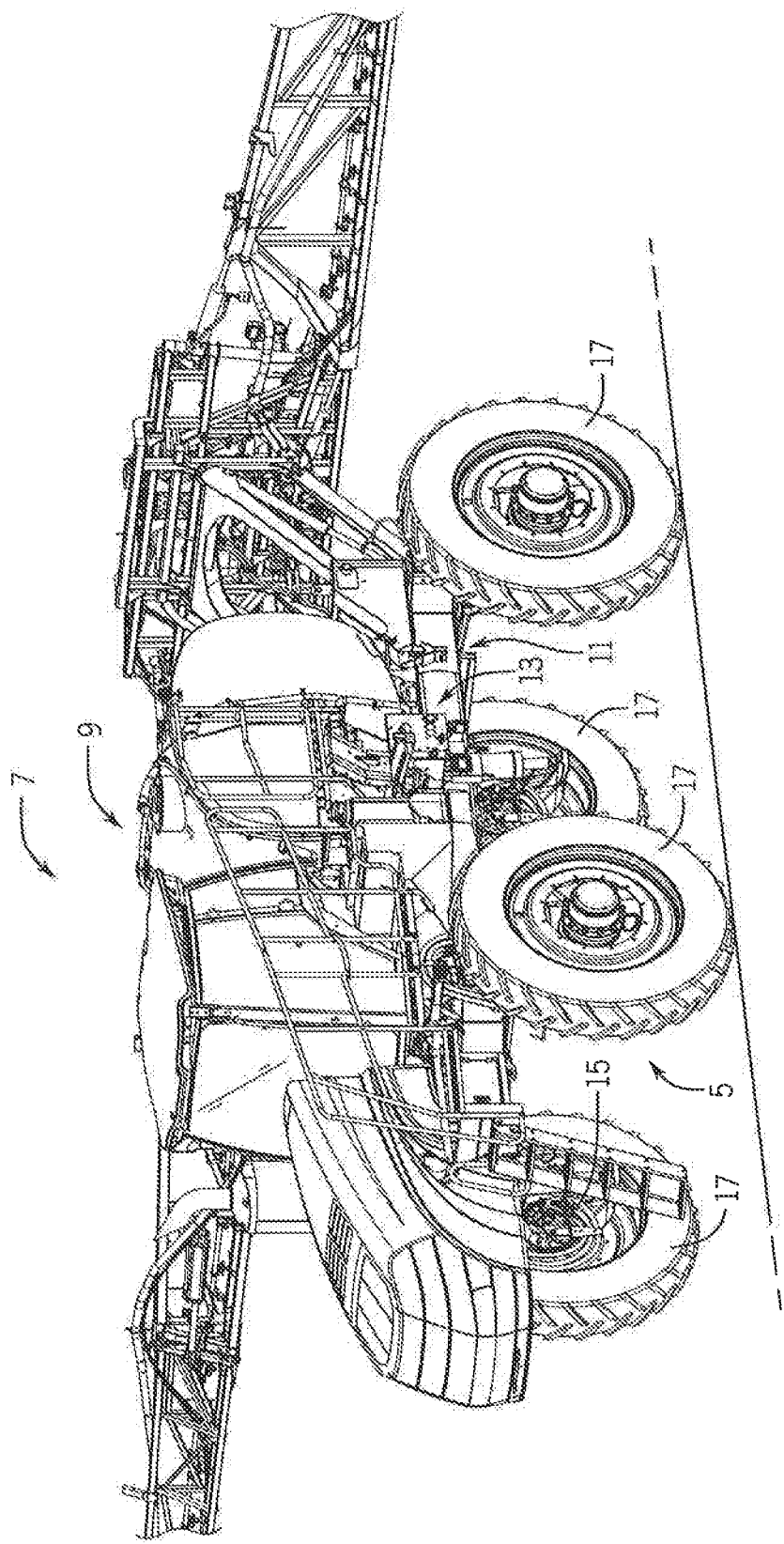
FIG. 1 is an isometric view of an agricultural machine shown as a self-propelled sprayer with a steering cylinder mount system with a bearing race friction lock assembly according to the present invention.

Referring now to the drawings and specifically to FIG. 1, steering cylinder mount system is shown as system 5 that facilitates rotation of steering system bearing races with respect to each other within a bearing in preference to a bearing race rotating with respect to its mounting component, such as a pin or bolt.

System 5 is incorporated in an agricultural machine shown as machine 7 which has steering components that incorporate spherical bearings, such as hydraulic ram-style steering systems that use steering cylinders. Machine 7 is shown here as a self-propelled sprayer 9, particularly as a rear-boom self-propelled sprayer 9 such as a Trident™ combination applicator available from CNH Industrial. Agricultural machines 7 may be other machines including other applicators such as other ones with rear-mounted booms as well as those with front-mounted or mid-mount booms and broadcast-type applicators, and yet other machines including harvesters, tractors, and other agricultural machines with steering components that incorporate spherical bearings, such as hydraulic ram-style steering.

Still referring to FIG. 1, machine 7 includes chassis 11 with chassis frame 13 that supports various assemblies, systems, and components. These various assemblies, systems, and components include a cab, engine, and hydraulic system. The hydraulic system receives power from the engine to provide hydraulic pressure for operating hydraulic components within the machine 7, including hydraulic steering system 15 that pivots the front wheels 17 during steering maneuvers or can pivot all four wheels 17 for machines 7 that have four-wheel steering systems 15.

Figure 2:
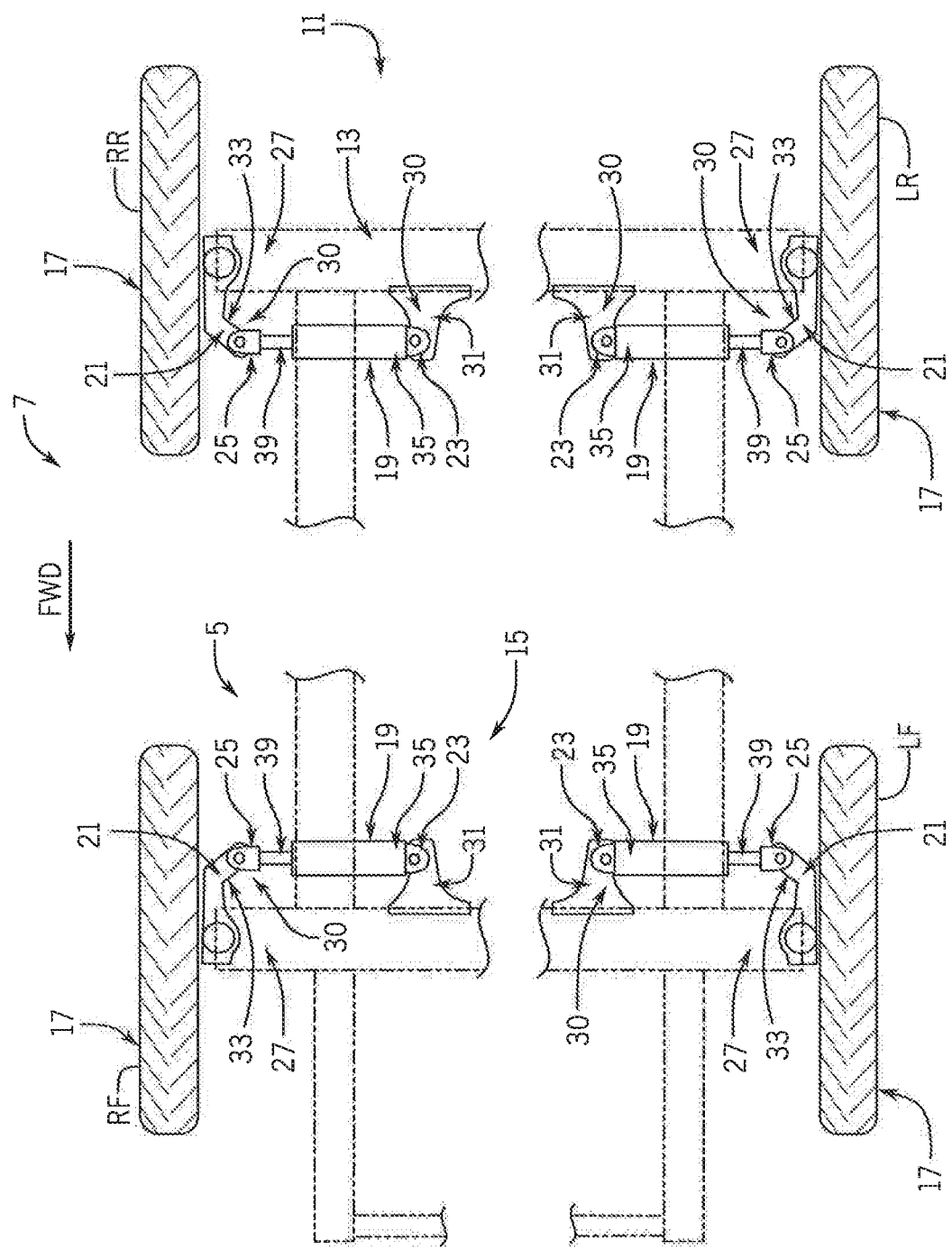
FIG. 2 is a simplified partially schematic top plan view of steering cylinder mount system of FIG. 1.

Referring now to FIG. 2, steering system 15 includes an actuator such as steering cylinder 19 that may be a double-acting cylinder actuated by the hydraulic pressure of the hydraulic system to push and pull a steering arm 21, which pivots the steering arm 21 about a pivot axis to turn the wheels 17 during the steering maneuver. The steering arm 21 may be supported by and pivot about or along with a steering kingpin or other generally vertical steering shaft to correspondingly pivot a wheel-supporting component or assembly, which may include, for example, a steering knuckle or upper suspension arm that may support a trailing link that supports a wheel 17 or its wheel motor. Steering cylinder 19 has a first end as an anchored end or fixed end 23 supported in a substantially fixed manner, for example, with respect to frame 13. A second end such as a movable end or actuating end 25 of the steering cylinder 19 can move with respect to the fixed end 23 to push or pull the steering arm 21 during turning maneuvers. The first and second or fixed and actuating ends 23, 25 are shown connected to mounting lugs 30 as support structures. The mounting lugs 30 are shown at a first location such as frame 13 or axle 27, represented here configured as anchoring mounting lug 31 that is connected to the axle 27 and supports the steering cylinder's fixed end 23. In some implementations of machine 7 (FIG. 1) with adjustable track width, the axles 27 may be configured as slider-type axles that selectively retract or extend telescopically into or from the frame 13 to reduce or increase the distances between the wheels 17 on the left and right sides of the machine 7 (FIG. 1). In adjustable track width versions with anchoring mounting lugs 31 connected to the axles 27, the anchoring mounting lugs 31 move in unison with the axles 27 during track width adjustment. Other mounting lugs 30 are shown at a second location as those on steering arm 21, represented here configured as steering arm mounting lugs 33 that support the steering cylinder's actuating end 25.

Figure 3:
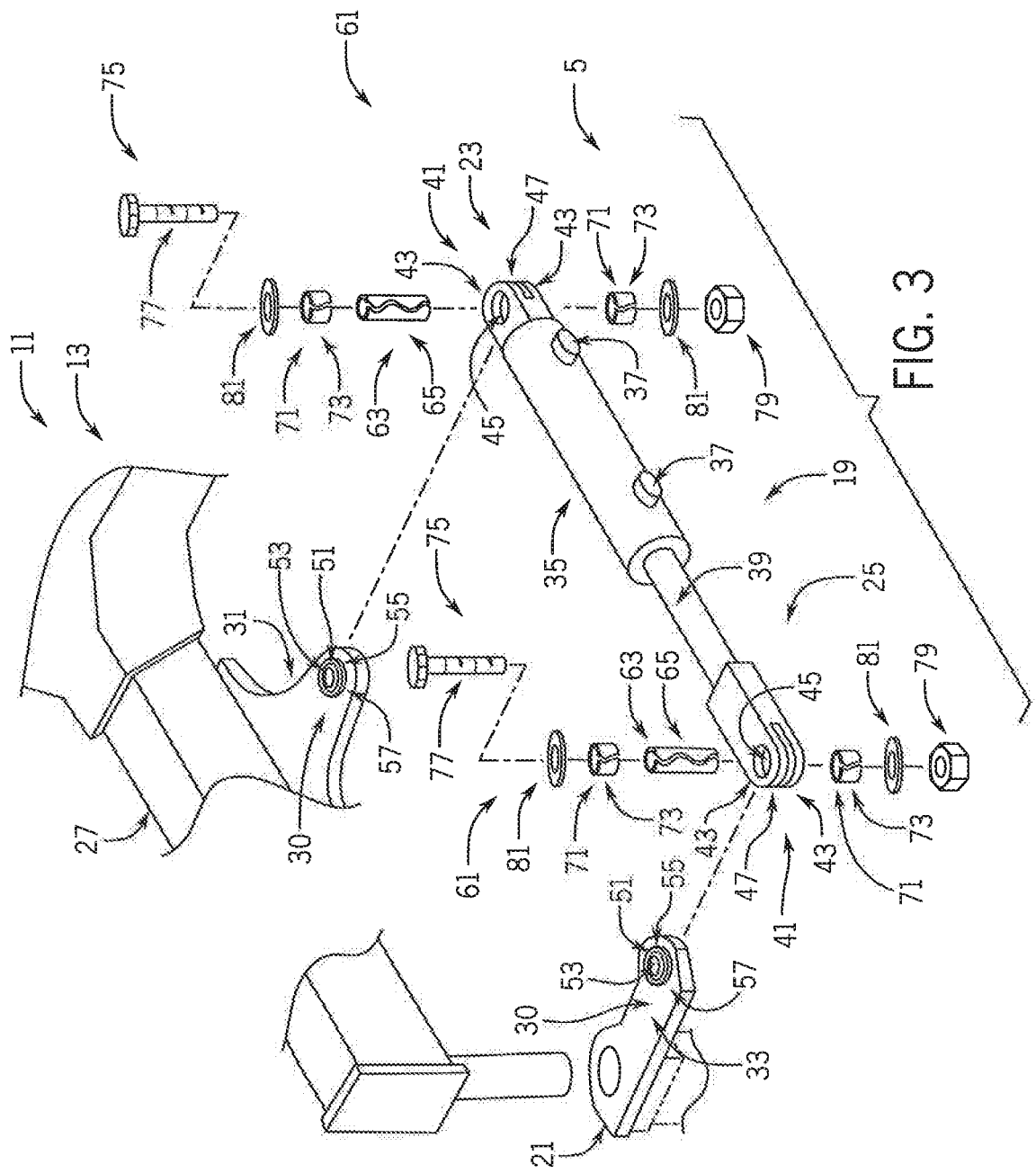
FIG. 3 is an isometric partially exploded view of the steering cylinder mount system of FIG. 1.

Referring now to FIG. 3, steering cylinder 19 has a cylinder body 35 with a cylinder bore in which a piston is mounted to reciprocate based on hydraulic flow direction and pressure(s) within the cylinder bore. The piston is driven by a volume of pressurized hydraulic fluid delivered through ports 37 of the cylinder body 35 that are connected to hydraulic lines of the hydraulic steering system 15. The pressurized hydraulic fluid is introduced through a port 37 into the cylinder bore on one side of the piston, which pushes the piston and drives another volume of hydraulic fluid out of the cylinder bore through another port 37. A rod 39 connected to the piston extends out of the cylinder body 35 and moves in unison with the piston so that controlling fluid flow into and out of the cylinder body 35 moves the rod 39 in unison with the piston.

Still referring to FIG. 3, each of the steering cylinder's fixed and actuating ends 23, 25 is shown here with a yoke 41 that attaches to the steering cylinder 19 to the respective mounting lug 30. Each yoke 41 has parallel spaced-apart first and second yoke lobes 43 with respective first and second yoke lobe bores 45 (only shown in the top yoke lobes 43) and separated from each other by a space 47. Space 47 is sized to receive a spherical bearing 51 that is mounted in the mounting lug 30. Spherical bearing 51 includes inner and outer races 53, 55, with the inner race 53 configured to rotate and pivot angularly with respect to the outer race 55. The outer race 55 is mounted in the mounting lug 30, for example, by way of a press fit into a bore 57 of the mounting lug 30 that may be connected to a grease passage through the lug 30 that can receive grease through a grease fitting (shown but not labeled in FIG. 4).

Still referring to FIG. 3, a bearing race friction lock assembly 61 is configured to lock the spherical bearing inner race 53 in rotational unison with various other components to ensure that spherical bearing inner race 53 rotates relative to its outer race 55 instead of rotating relative to an internally supporting component(s). Bearing friction lock assembly 61 includes a sleeve 63 that is configured to frictionally engage and apply circumferential or radial outward pressure to the spherical bearing inner race 53. Sleeve 63 is shown here as a tension bushing or split spring bushing, represented as inner split spring bushing 65 with a gap in its circumferential side wall, shown here with a wavy slot configuration. The gap facilitates the circumferential side wall circumferentially compressing from a resting state to a circumferentially compressed state and the material properties of the side wall provides a restorative force so that it circumferentially biases outwardly toward the resting state from the circumferentially compressed state. This applies a radial outward force against the spherical bearing inner race 53 and lock the inner race 53 and inner split spring bushing 65 into rotational unison with each other. Other configurations of the sleeve(s) 63 are contemplated, including inner split spring bushings 65 with straight slots or other sleeves 63 that can bias against or otherwise sufficiently frictionally engage the inner race 53 to lock them into rotational unison with each other. First and second collars 71 are mounted in the yoke lobe bores 45 and are configured to frictionally engage and apply circumferential or radial outward pressure to the yoke lobes 43. Similar to sleeve 63, each collar 71 is also shown here as a tension bushing or split spring bushing, represented as outer split spring bushing 73, shown here as shorter than and with larger inside and outside diameters than the inner split spring bushings 65 implemented as sleeve 63. The pair of collars 71 is configured to frictionally engage and apply axial or longitudinal pressure against the spherical bearing inner race 53 from opposite ends, squeezing or compressing the inner race 53 by a clamping force provided by fastener system 75. Fastener system 75 is shown having bolt 77 which may be a close tolerance bolt that closely matches the inside diameter bore of the sleeve 63 to closely or snugly fit in the bore of sleeve 63 and is threadedly engaged by nut 79 and supports washers 81 between the head of bolt 77 and nut 79.

Figure 4:
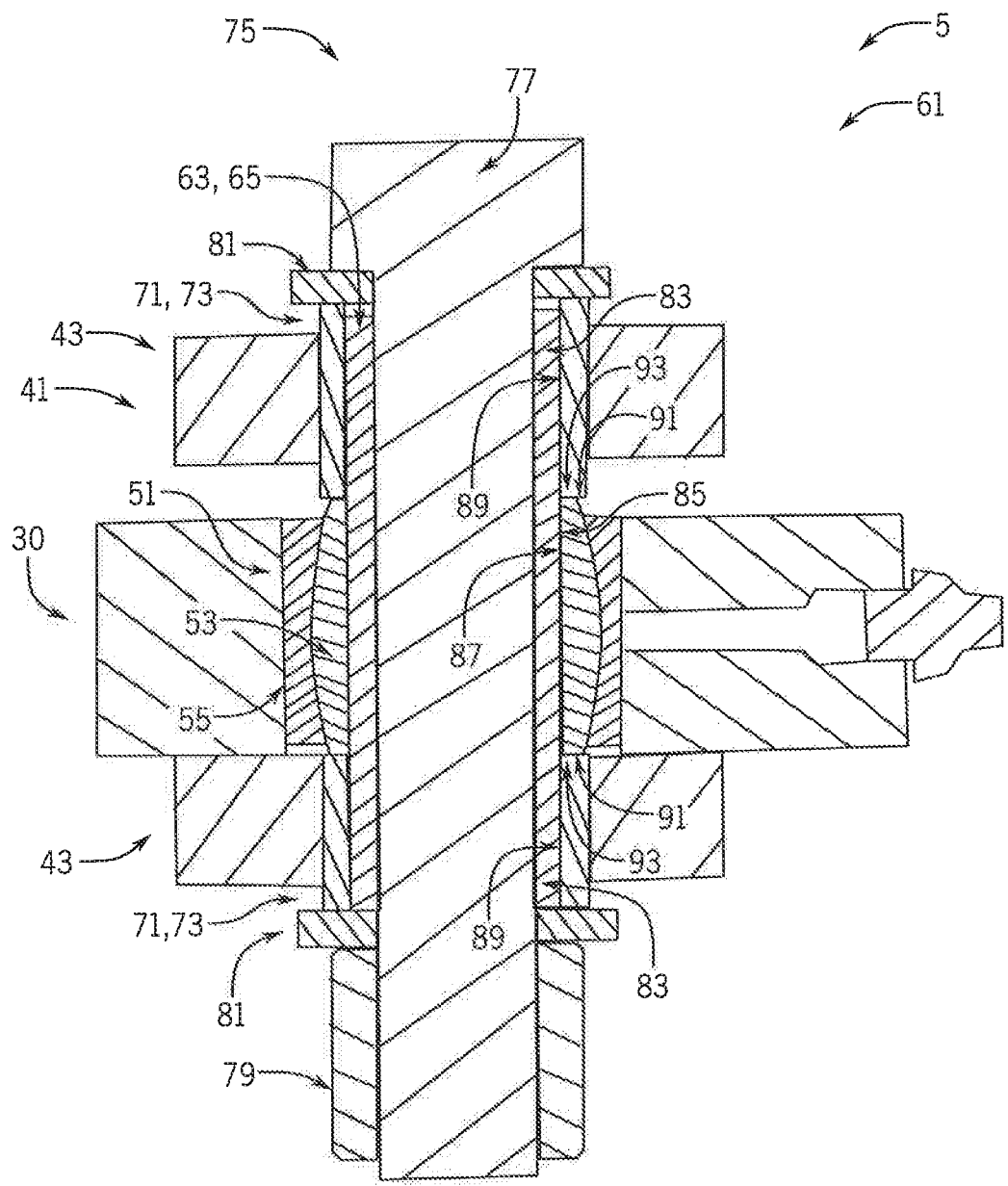
FIG. 4 is a cross-sectional view of a bearing race friction lock assembly of the steering cylinder mount system of FIG. 1.

Referring now to the assembly shown in FIG. 4, bearing race friction lock assembly 61 frictionally engages multiple surfaces of the spherical bearing's inner race 53 to lock the inner race 53 with respect to its inwardly arranged supporting components, such as sleeve 63 and bolt 77, to ensure rotation of the inner race 53 with respect to the outer race 55. Inner split spring bushing 65 is pressed into the spherical bearing's inner race 53 so that the ends 83 of the inner split spring bushing 65 extend past the inner race 53 in both directions. This inner split spring bushing 65 expands in the inside diameter of the inner race 53 and has an outer circumferential surface 85 that applies pressure outwardly against the inner race's 53 inner circumferential surface 87. This provides a frictional engagement that locks the inner split spring bushing 65 and the inner race 53 to each other and prevents their rotation with respect to each other. Above and below the inner race 53 at the inner split spring bushing ends 83, the outer circumferential surface 85 engages inner circumferential surfaces 89 of the outer split spring bushings 73.

Still referring to FIG. 4, spherical bearing inner race 53 has end surfaces such as annular end surfaces 91 that face and engage end surfaces such as annular end surfaces 93 of the outer split spring bushings 73 that face inwardly. The inner split spring bushing 65 is shorter than the combined length of the pair of outer split spring bushings 73 and the spherical bearing inner race 53. Accordingly, there is a gap between an end surface(s) of the inner split spring bushing 65 and a corresponding washer(s) 81, which ensures that the outer spring bushings 73 will press against the edges or end surfaces of the spherical bearing inner race 53. Outwardly facing end surfaces of the outer split spring bushings 73 engage corresponding surfaces of the washers 81 so that tightening bolt 77 into nut 79 axially compresses the outer split spring bushings 73 and spherical bearing inner race 53. In this way, outer split spring bushings 73 press against the ends or annular end surfaces 91 of the inner race 53 as a first end surface frictional engagement interface that is defined by the abutting end surfaces 91, 93 of the inner race 53 and one of the split ring bushings 73. A second end surface frictional engagement interface is defined by the abutting end surfaces 91, 93 of the inner race 53 and the other split ring bushings 73

Figure 5:
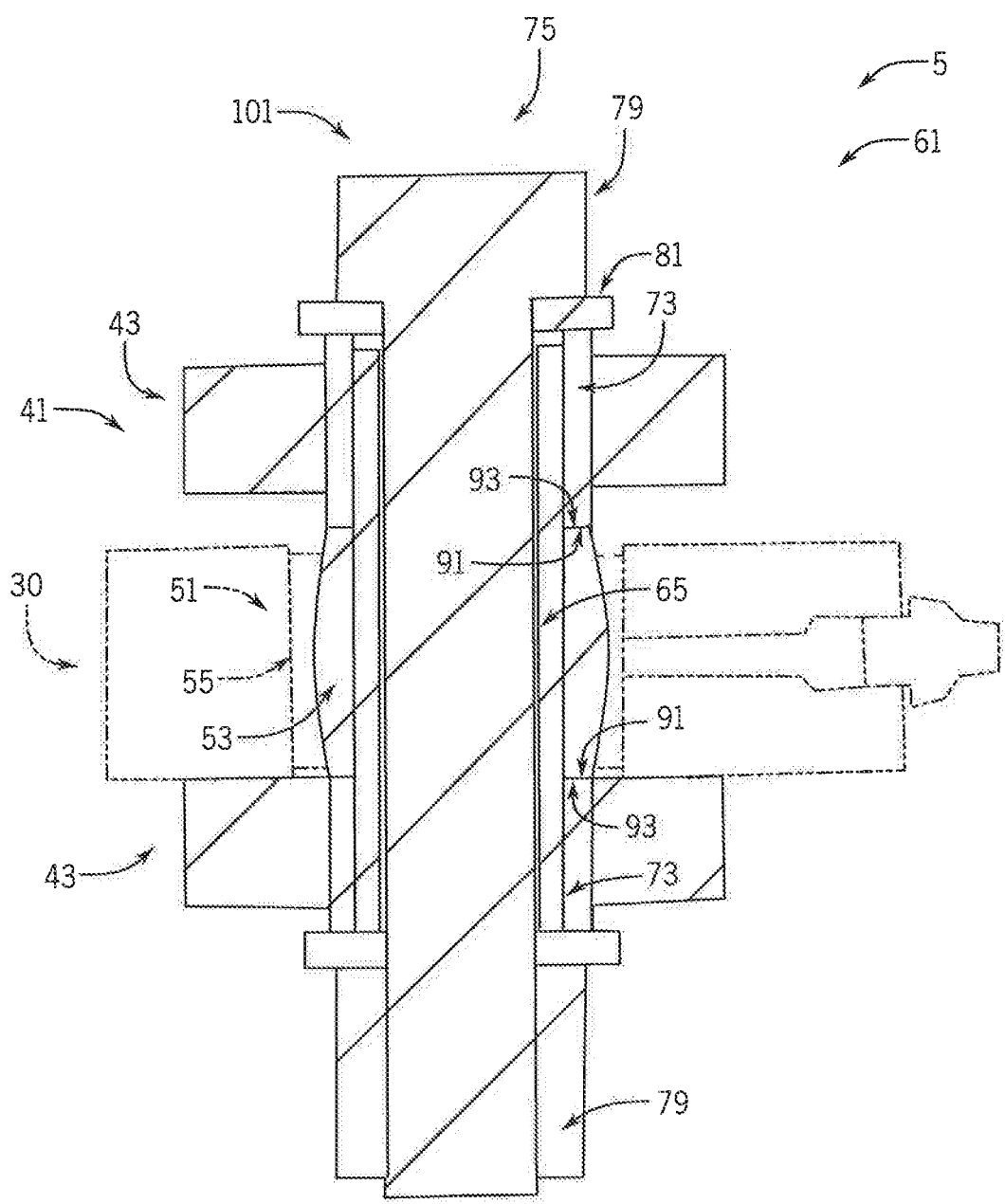
FIG. 5 is a variant of the cross-sectional view of the bearing race friction lock assembly of FIG. 4.

Referring now to FIG. 5, a friction-locked rotatable stack 101 is defined by the components that frictionally engage each other to hold them as a unit and ensure the spherical bearing inner race 53 and outer race 55 rotate with respect to each other. Outwardly biasing forces are provided by the inner and outer split spring bushing 65, 73 and axial or longitudinal compressive forces are provided by fastener system 75. Radial or concentric outwardly biasing forces are provided by the inner split spring bushing 65 against the inner race 53 and the outer split spring bushing 73, with the outer split spring bushings 73 further biasing against the yoke lobes 43, frictionally locking the assemblage together with outwardly biasing forces. In this way, an outwardly directed frictional force is defined at least partially by the inner split spring bushing 65 circumferentially biasing outwardly against the inner circumferential surface of the spherical bearing inner race 53. Tightening the bolt 77 compresses and axially locks the bolt 77, washers 81 and outer split spring bushings 73, and the spherical bearing inner race 53 to each other, frictionally locking the assemblage together with axial biasing forces that are generally perpendicular with respect to the outward biasing force(s) of the inner split spring bushing 65. Accordingly, the spherical bearing inner race 53 is sandwiched between the outer split spring bushings 73, which apply longitudinal forces in opposite directions against the inner race 53 to clamp the inner race 53 between the outer split spring bushing 73. A first longitudinally directed frictional force is defined by an annular end surface 93 of one of the outer split spring bushings 73 pressing against the corresponding annular end surface 91 of the spherical bearing inner race 53 in a first longitudinal direction. A second longitudinally directed frictional force is defined by an annular end surface 93 of the other outer split spring bushing 73 pressing against the second annular end surface 91 of the spherical bearing inner race 53 in a second longitudinal direction. The friction-locked rotatable stack 101 correspondingly has its components frictionally locked to each other and also to the yoke lobes 43, which ensures rotation of the spherical bearing inner and outer races 53, 55 with respect to each other in preference to inner race 53 rotating with respect to any internally arranged supporting components.

Although described with the yokes 41 at ends of the steering cylinder 19 and the spherical bearing mounting lugs 30 at the steering arm 21 and frame 13 or axle 27, the steering cylinder mount system 5 could have other configurations, including being reversed. In one example, the steering cylinder mount system 5 could be configured so that the spherical bearings 51 are be pressed into the steering cylinder 19 ends and the yokes 41 could be incorporated as mounts or part(s) of the steering arm(s) 21 and frame 13 or axle 27.

Many changes and modifications could be made to the invention without departing from the spirit thereof. The scope of these changes will become apparent from the appended claims.

We claim:

1. A mount system for an agricultural machine, the mount system comprising:
   a steering cylinder with first and second ends;
   a mounting lug configured to support one of the first and second ends of the steering cylinder;
   a spherical bearing including:
      an outer race supported by the mounting lug; and
      an inner race supported by the spherical bearing outer race and configured to rotate and pivot angularly with respect to the spherical bearing outer race;
   an inner split spring bushing extending through the spherical bearing inner race, the inner split spring bushing having first and second ends;
   a first outer split spring bushing extending about the first end of the inner slit spring bushing; and
   a second outer split bushing extending about the second end of the inner split spring bushing; and
   a bearing race friction lock assembly that frictionally engages the first and second ends of the spherical bearing inner race and is configured to lock in rotational unison the spherical bearing inner race.

2. A mount system for an agricultural machine including a steering cylinder having first and second ends, the mount system comprising:
   a mounting lug configured to support one of the first and second ends of the steering cylinder;
   a spherical bearing including:
      an outer race supported by the mounting lug; and
      an inner race supported by the spherical bearing outer race and configured to rotate and pivot angularly with respect to the spherical bearing outer race; and
   a bearing race friction lock assembly that frictionally engages multiple surfaces of the spherical bearing inner race and is configured to lock in rotational unison the spherical bearing inner race;
   wherein the bearing race friction lock assembly further comprises:
      an inner split spring bushing mounted concentrically inside and frictionally engaging the spherical bearing inner race, wherein the inner split spring bushing is longer than the spherical bearing inner race and has:
         a first inner split spring bushing end that extends beyond the spherical bearing inner race in a first direction; and
         a second inner split spring bushing end that extends beyond the spherical bearing inner race in a second direction;
      a first outer split spring bushing mounted concentrically outside the first inner split spring bushing end; and
      a second outer split spring bushing mounted concentrically outside the second inner split spring bushing end.

3. The mount system of claim 2, wherein:
   the inner split spring bushing biases outwardly to apply a radial frictional engagement with an inner circumferential surface of the spherical bearing inner race;
   the first outer split spring bushing engages a first end surface of the spherical bearing inner race;
   the second outer split spring bushing engages a second end surface of the spherical bearing inner race; and
   a fastener system extends through the inner split spring bushing, the first and second outer split spring bushings, and the spherical bearing inner race, the fastener system configured to apply a compressive force to the first and second outer split ring bushings to provide face-to-face axial frictional engagements between the first and second end surfaces of the spherical bearing inner faces and each of the first and second outer split spring bushings.

4. The mount system of claim 3, wherein the fastener system includes a bolt that extends through a bore in the inner split spring bushing and is tightened to:
   draw the first and second outer spring bushings closer to each other; and
   axially clamp the spherical bearing inner race between the first and second outer spring bushings.

5. The mount system of claim 4, wherein a friction-locked rotatable stack is defined by:
   the bolt;
   the inner split spring bushing;
   the first outer split spring bushing;
   the second outer split spring bushing; and
   the spherical bearing inner race;

all of which are frictionally locked to rotate in unison with each other.

6. The mount system of claim 4, wherein at least one of the steering cylinder first and second ends includes a yoke with a first yoke lobe and a second yoke lobe that are transversely spaced from each other and wherein:
the first split spring bushing is mounted in the first yoke lobe; and
the second split spring bushing is mounted in the second yoke lobe,
wherein the friction-locked rotatable stack moves in unison with the steering cylinder yoke.

7. A mount system for an agricultural machine, the mount system comprising:
a mounting lug assembly, including:
a mounting lug with a mounting lug bore;
a spherical bearing, including:
an outer race that is pressed into the bore of the mounting lug; and
an inner race mounted concentrically in the outer race and configured to rotate and pivot angularly within the outer race, the inner race having:
an inner circumferential surface that extends around an inner race bore;
a steering cylinder, including:
a yoke at an end of the steering cylinder, the yoke including:
a first yoke lobe with a first yoke lobe bore;
a second yoke lobe with a second yoke lobe bore coaxially aligned with the first yoke lobe bore; and
a bearing race friction lock assembly, including:
a sleeve mounted inside the spherical bearing inner race bore with a first end that extends beyond the spherical bearing in a first direction and a second end that extends beyond the spherical bearing in a second direction;
a first collar mounted in the first yoke lobe bore and concentrically outside the first end of the sleeve;
a second collar mounted in the second yoke lobe bore and concentrically outside the second end of the sleeve; and
a fastener system extending through the sleeve and the first and second collars and engageable with the first and second ends of the sleeve, the fastener system applying a longitudinal compressive force to the first and second collars and the spherical bearing inner race to lock the first and second collars into rotational unison with the spherical bearing inner race.

8. A mount system for an agricultural machine, the mount system comprising:
a mounting lug assembly, including:
a mounting lug with a mounting lug bore;
a spherical bearing, including:
an outer race that is pressed into the bore of the mounting lug; and
an inner race mounted concentrically in the outer race and configured to rotate and pivot angularly within the outer race, the inner race having:
an inner circumferential surface that extends around an inner race bore;
a steering cylinder, including:
a yoke at an end of the steering cylinder, the yoke including:
a first yoke lobe with a first yoke lobe bore;
a second yoke lobe with a second yoke lobe bore coaxially aligned with the first yoke lobe bore; and
a bearing race friction lock assembly, including:
a sleeve mounted inside the spherical bearing inner race bore with a first end that extends beyond the spherical bearing in a first direction and a second end that extends beyond the spherical bearing in a second direction;
a first collar mounted in the first yoke lobe bore and concentrically outside the first end of the sleeve;
a second collar mounted in the second yoke lobe bore and concentrically outside the second end of the sleeve; and
a fastener system extending through the sleeve and the first and second collars and applying a longitudinal compressive force to the first and second collars and the spherical bearing inner race to lock the first and second collars into rotational unison with the spherical bearing inner race;
wherein each of the sleeve and first and second collars comprises a split spring bushing with each of the split spring bushings having a circumferential side wall:
with a gap that allows the circumferential side wall to circumferentially compress from a resting state to a circumferentially compressed state; and
that is configured to circumferentially bias outwardly toward the resting state from the circumferentially compressed state.

9. The mount system of claim 8, wherein:
an inner split spring bushing defines the sleeve;
a first outer split spring bushing defines the first collar; and
a second outer split spring bushing defines the second collar.

10. The mount system of claim 9, wherein the inner split spring bushing circumferentially biases outward and:
frictionally engages the inner circumferential surface of the spherical bearing inner race;
frictionally engages an inner circumferential surface of the first outer split ring; and
frictionally engages an inner circumferential surface of the second outer split ring.

11. The mount system of claim 10, wherein a friction-locked rotatable stack is defined by:
the fastener system;
the inner split spring bushing;
the first outer split spring bushing;
the second outer split spring bushing; and
the spherical bearing inner race;
all of which rotate in unison with the yoke at the end of the steering cylinder.

12. The mount system of claim 9, wherein the inner split spring bushing and the first and second outer split spring bushings define a split spring arrangement that frictionally engages the spherical bearing inner race at multiple frictional engagement interfaces, including:
an inner circumferential surface frictional engagement interface defined by an engagement between an outer circumferential surface of the inner split ring bushing and the inner circumferential surface of the spherical bearing inner race;
a first end surface frictional engagement interface defined by abutting annular end surfaces of the spherical bearing inner race and the first split ring bushing; and
a second end surface frictional engagement interface defined by abutting annular end surfaces of the spherical bearing inner race and the second split ring bushing.

13. The mount system of claim 9, wherein the inner split spring bushing and the first and second outer split spring bushings define a split spring arrangement that applies frictional forces against the spherical bearing inner race in multiple directions, the multiple frictional forces including:
- an outwardly directed frictional force defined by the inner split spring bushing circumferentially biasing outwardly against the inner circumferential surface of the spherical bearing inner race;
- a first longitudinally directed frictional force defined by an annular end surface of the first outer split spring bushing pressing against a first annular end surface of the spherical bearing inner race in a first longitudinal direction; and
- a second longitudinally directed frictional force defined by an annular end surface of the second outer split spring bushing pressing against a second annular end surface of the spherical bearing inner race in a second longitudinal direction.

14. A mount system for an agricultural machine, the mount system comprising:
- a mounting lug assembly, including:
  - a mounting lug with a mounting lug bore;
  - a spherical bearing, including;
    - an outer race that is pressed into the bore of the mounting lug; and
    - an inner race mounted concentrically in the outer race and configured to rotate and pivot angularly within the outer race, the inner race having:
      - an inner circumferential surface that extends around an inner race bore;
- a steering cylinder, including:
  - a yoke at an end of the steering cylinder, the yoke including:
    - a first yoke lobe with a first yoke lobe bore;
    - a second yoke lobe with a second yoke lobe bore coaxially aligned with the first yoke lobe bore; and
- a bearing race friction lock assembly, including:
  - a sleeve mounted inside the spherical bearing inner race bore with a first end that extends beyond the spherical bearing in a first direction and a second end that extends beyond the spherical bearing in a second direction;
  - a first collar mounted in the first yoke lobe bore and concentrically outside the first end of the sleeve;
  - a second collar mounted in the second yoke lobe bore and concentrically outside the second end of the sleeve; and
  - a fastener system extending through the sleeve and the first and second collars and applying a longitudinal compressive force to the first and second collars and the spherical bearing inner race to lock the first and second collars into rotational unison with the spherical bearing inner race;

wherein the mounting lug assembly is connected to a steering arm of the agricultural machine with the mounting lug moveable to push or pull the steering arm and pivot a wheel during a steering maneuver.

15. A mount system for an agricultural machine, the mount system comprising:
- a mounting lug assembly, including:
  - a mounting lug with a mounting lug bore;
  - a spherical bearing, including:
    - an outer race that is pressed into the bore of the mounting lug; and
    - an inner race mounted concentrically in the outer race and configured to rotate, and pivot angularly within the outer race, the inner race having:
      - an inner circumferential surface that extends around an inner race bore;
- a steering cylinder, including:
  - a yoke at an end of the steering cylinder, the yoke including:
    - a first yoke lobe with a first yoke lobe bore;
    - a second yoke lobe with a second yoke lobe bore coaxially aligned with the first yoke lobe bore; and
- a bearing race friction lock assembly, including:
  - a sleeve mounted inside the spherical bearing inner race bore with a first end that extends beyond the spherical bearing in a first direction and a second end that extends beyond the spherical bearing in a second direction;
  - a first collar mounted in the first yoke lobe bore and concentrically outside the first end of the sleeve;
  - a second collar mounted in the second yoke lobe bore and concentrically outside the second end of the sleeve; and
  - a fastener system extending through the sleeve and the first and second collars and applying a longitudinal compressive force to the first and second collars and the spherical bearing inner race to lock the first and second collars into rotational unison with the spherical bearing inner race;

wherein the mounting lug assembly is connected to a frame of the agricultural machine, so the mounting lug is fixed with respect to the frame during the steering maneuver.

16. A mount system for an agricultural machine, the mount system comprising:
- a mounting lug assembly, including:
  - a mounting lug with a mounting lug bore;
  - a spherical bearing, including:
    - an outer race that is pressed into the bore of the mounting lug; and
    - an inner race mounted concentrically in the outer race and configured to rotate and pivot angularly within the outer race, the inner race having:
      - an inner circumferential surface that extends around an inner race bore;
- a steering cylinder, including:
  - a yoke at an end of the steering cylinder, the yoke including:
    - a first yoke lobe with a first yoke lobe bore;
    - a second yoke lobe with a second yoke lobe bore coaxially aligned with the first yoke lobe bore; and
- a bearing race friction lock assembly, including:
  - a sleeve mounted inside the spherical bearing inner race bore with a first end that extends beyond the spherical bearing in a first direction and a second end that extends beyond the spherical bearing in a second direction;
  - a first collar mounted in the first yoke lobe bore and concentrically outside the first end of the sleeve;
  - a second collar mounted in the second yoke lobe bore and concentrically outside the second end of the sleeve; and
  - a fastener system extending through the sleeve and the first and second collars and applying a longitudinal compressive force to the first and second collars and the spherical bearing inner race to lock the first and second collars into rotational unison with the spherical bearing inner race;

wherein the mounting lug assembly is connected to an axle of the agricultural machine, so the mounting lug is fixed with respect to the axle during the steering maneuver.

17. A method of assembling a mount system for an agricultural machine, with the system including a mounting lug with a spherical bearing and a steering cylinder with a yoke with first and second yoke lobes connected to the mounting lug, the method comprising:

pressing a first collar into a first yoke lobe of the yoke;

pressing a second collar into a second yoke lobe of the yoke;

arranging the mounting lug within the yoke so that the bores of the first collar, the second collar, and an inner race of the spherical bearing align with each other;

pressing a sleeve through the bores of the first collar, the second collar, and the spherical bearing inner race so the sleeve concentrically and frictionally engages the first collar, the second collar, and the inner race of the spherical bearing;

inserting a fastener through the sleeve such that a head of the fastener engages a first end of the sleeve; and tightening the fastener against a second end of the sleeve to lock at least the fastener, the sleeve, and the spherical bearing inner race for movement in unison with each other.

18. A method of assembling a mount system for an agricultural machine, with the system including a mounting lug with a spherical bearing and a steering cylinder with a yoke with first and second yoke lobes connected to the mounting lug, the method comprising:

pressing a first collar into a first yoke lobe of the yoke;

pressing a second collar into a second yoke lobe of the yoke;

arranging the mounting lug within the yoke so that the bores of the first collar, the second collar, and an inner race of the spherical bearing align with each other;

pressing a sleeve through the bores of the first collar, the second collar, and the spherical bearing inner race so the sleeve concentrically and frictionally engages the first collar, the second collar, and the inner race of the spherical bearing;

inserting a fastener through the sleeve; and tightening the fastener to lock at least the fastener, the sleeve, and the spherical bearing inner race for movement in unison with each other;

wherein the sleeve is defined by an inner split spring bushing that:

circumferentially compresses while being driven into the spherical bearing inner race; and circumferentially biases outwardly toward a resting state and against and frictionally engages an inner circumferential surface of the spherical bearing inner race.

19. The method of claim 18 further comprising:

frictionally engaging a first portion of an outer circumferential surface of the inner split spring bushing against an inner circumferential surface of the first collar; and frictionally engaging a second portion of an outer circumferential surface of the inner split spring bushing against an inner circumferential surface of the second collar.

20. The method of claim 19 further comprising:

frictionally engaging a surface of a washer with an end surface of one of the first and second collars so that the tightening of the fastener longitudinally compresses the spherical bearing inner race between the first and second collars.

* * * * *